United States Patent [19]

Capler, Jr. et al.

[11] 4,455,038
[45] Jun. 19, 1984

[54] INDEPENDENT SUSPENSION FOR LIGHT TRAILERS

[76] Inventors: William H. Capler, Jr., 20701 Carlysle, Dearborn, Mich. 48124; Melvin J. Cordts, 19730 Marilyn, Northville, Mich. 48167

[21] Appl. No.: 408,791

[22] Filed: Aug. 17, 1982

Related U.S. Application Data

[63] Continuation of Ser. No. 185,271, Sep. 8, 1980, abandoned.

[51] Int. Cl.³ .............................................. B60G 3/00
[52] U.S. Cl. ..................................... 280/701; 280/690
[58] Field of Search ........................ 280/701, 690, 670

[56] References Cited

U.S. PATENT DOCUMENTS

| | | | |
|---|---|---|---|
| 2,156,580 | 5/1939 | Best | 280/670 |
| 2,299,926 | 10/1942 | Phelps | 280/670 |
| 2,563,370 | 8/1951 | Reese | 280/670 |
| 2,805,868 | 9/1957 | Madden | 280/701 |
| 2,992,013 | 7/1961 | Zeigler et al. | 280/670 |
| 3,024,039 | 3/1962 | Zeigler et al. | 280/701 |
| 3,123,350 | 3/1964 | Zeigler et al. | 280/701 |

Primary Examiner—David M. Mitchell
Assistant Examiner—Ross Weaver
Attorney, Agent, or Firm—Harness, Dickey & Pierce

[57] ABSTRACT

An independent wheel suspension for a light trailer comprising an axle assembly to which a wheel can be rotatably attached, a track member for guiding the movement of the axle in a vertical direction, and a spring assisted shock absorber spanning and mounted to an upper and a lower mounting bracket, the upper bracket affixed to the trailer frame and the lower bracket vertically moveable with the axle assembly in a guide track operably associated with the lower bracket.

1 Claim, 5 Drawing Figures

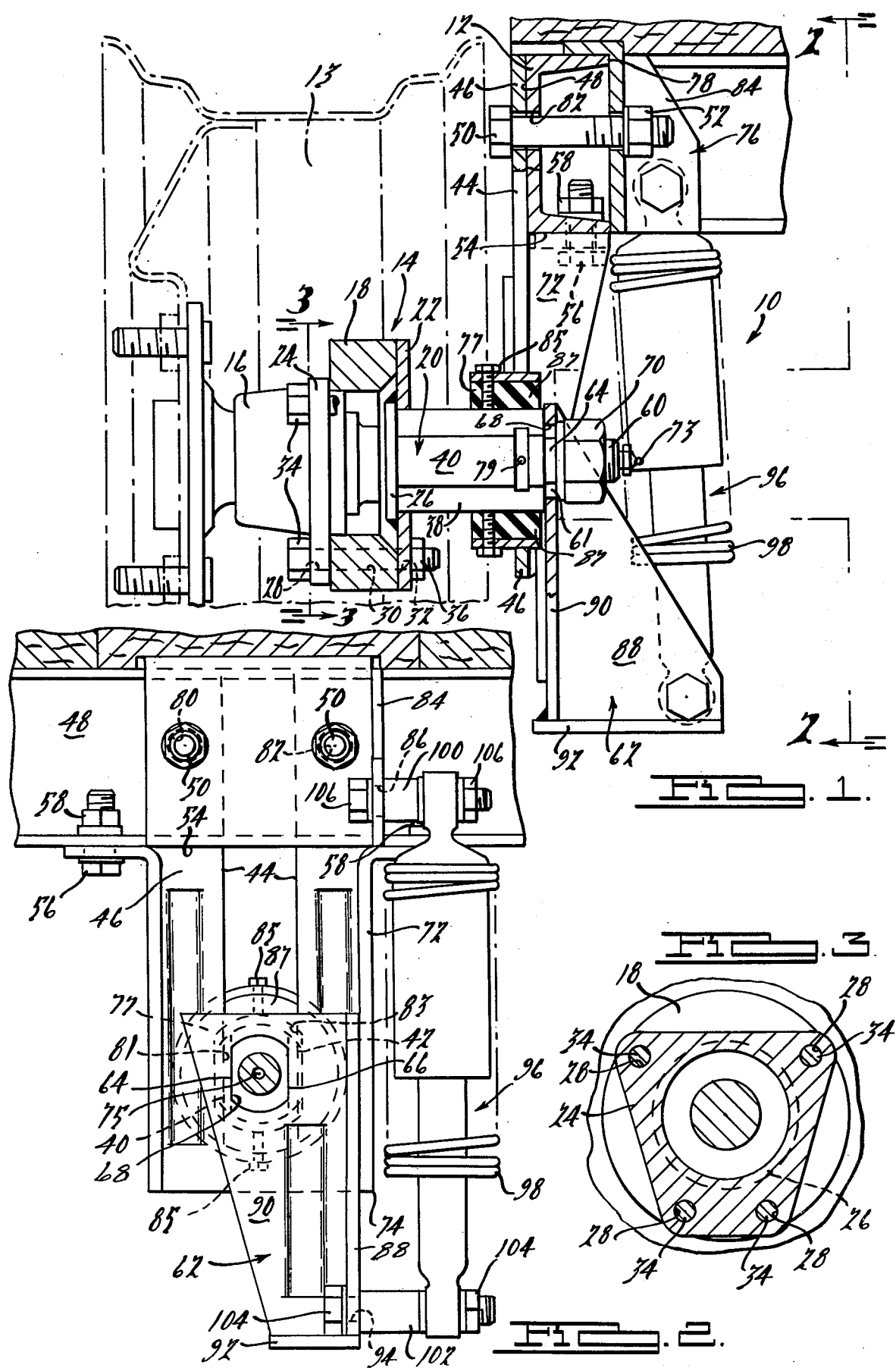

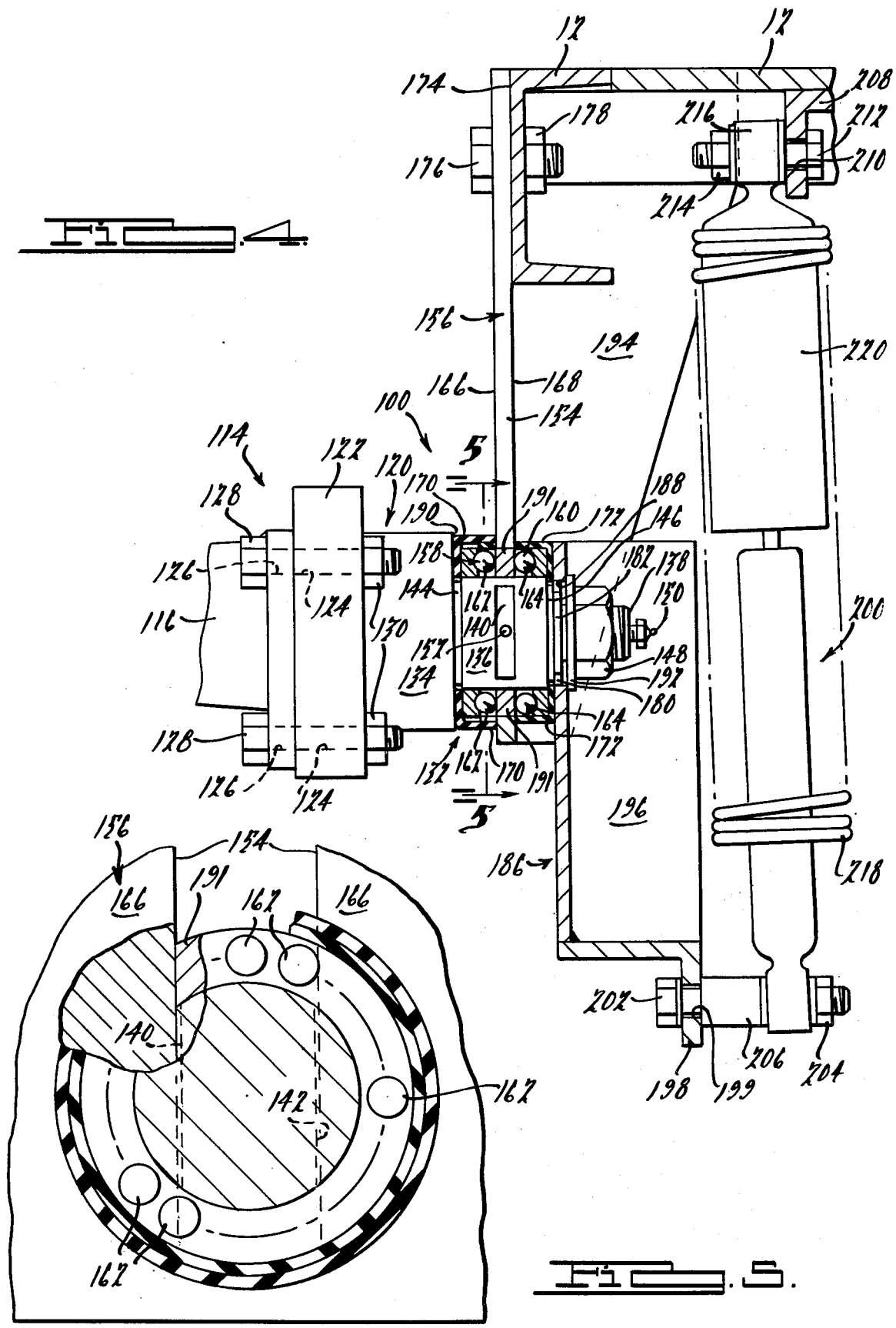

INDEPENDENT SUSPENSION FOR LIGHT TRAILERS

This is a continuation of application Ser. No. 185,271, filed Sept. 8, 1980, now abandoned.

BACKGROUND AND SUMMARY OF THE INVENTION

The present invention relates generally to independent wheel suspensions and particularly to an improved independent wheel suspension to be utilized most optimally with light trailers, particularly those compatible with the compact and sub-compact automobiles in vogue at present and increasing in popularity as fuel expense rises.

Small automobiles represent one haven to which a person may go to withstand the rising cost of fuel prices. But small automobiles have an attendant problem of lack of storage space in the transport of goods. Luggage racks provide one alternative to increase the load carrying capacity of small automobiles. Small trailers are another good transportion alternative, to which the present invention is directed. Light trailers also provide a more appealing option for loads which may potentially damage the automobile aesthetically or for increasing the storage capacity of small trucks, motorcycles and other motor vehicles.

Cost is a very significant consideration for the light trailer purchaser. The cost of the trailer can be greatly reduced by providing an inexpensive, low maintenance suspension system.

Accordingly, it is an object of the present invention to provide a wheel suspension system for a light trailer having a minimum number of parts while also being as simple in construction as possible. A further object is to provide a low cost trailer having a low cost independent suspension system in combination with the object of few parts and low maintenance.

Other objects and advantages of the instant invention will be apparent in the following specification, claims and drawings.

BRIEF DESCRIPTION OF THE DRAWINGS

FIG. 1 is a front view partially in section of an exemplary embodiment of a wheel suspension of the present invention on a light trailer;

FIG. 2 is a view taken along the line 2—2 of FIG. 1;

FIG. 3 is a view taken along the line 3—3 of FIG. 1;

FIG. 4 is a front view partially in section of an alternative embodiment of a wheel suspension of the present invention on a light trailer; and FIG. 5 is a view taken along the line 5—5 of FIG. 4.

DESCRIPTION OF THE PREFERRED EMBODIMENTS

Referring to FIG. 1, one embodiment of the independent suspension 10 of the present invention is illustrated mounted to the frame 12 of a light trailer and having a wheel 13 attached thereto. Each wheel 13 of the trailer 12 is attached to an axle assembly 14 comprised of a spindle 16, an annular spacer 18, and axle 20, and an annular axle plate 22. The axle plate 22 is welded to the axle 20 along flange 26 of the axle 20. The spindle 16 illustrated is of the type designated by the name "Integral Spindle" and manufactured by New Departure Hyatt Bearings of Sandusky, Ohio. A spindle connecting plate 24, of an offset trapezoidal configuration as seen more clearly in FIG. 3, interfaces the spindle with the spacer 18 and axle plate 22. The spindle connecting plate 24, spacer 18, and axle plate 22 each have four concentrically aligned throughbores, generally designated 28, 30, and 32, on each part, respectively. Four bolts 34 are inserted in the bores 28, 30, and 32 and nuts 36 are fastened thereto to interconnect the axle assembly 14.

The axle 20 has an extended portion 38 having faced surfaces 40 and 42 on opposite sides. The extended portion 38 is slideably fit into the slot or track 44 of track member or yoke 46. Yoke 46 is directly attached to the outward surface 48 of the frame 12 at two locations by bolts 50 and nuts 52, and to the lower surface 54 of frame 12 at two locations by bolts 56 and nuts 58.

The axle 20 also has a threaded boss portion 60 which supports an L-shaped lower mounting bracket 62. Between the boss portion 60 and the extended portion 38 of the axle 20 is an intermediate portion 61 having two faces 64 and 66. The lower bracket 62 has an aperture 68 of a configuration substantially matching the transverse configuration of the intermediate portion 61 at the faces 64 and 66. Nut 70 is threadably fastened to the extended portion 60 whereby the axle assembly 14, yoke 46, and lower mounting bracket 62 are interconnected. Yoke or track member 46 also has a flange 72 at the side edge 74 thereof which forms a second track or guide means for the vertical movement of the lower bracket 62. A zerk fitting 73 is affixed to the end of boss 60 and is operably associated with suitable lubrication means 75 in the axle assembly 14. An annular wiper 77 having inner faced surfaces 81 and 83 corresponding to faced surfaces 40 and 42 and having a reduced portion 85 that fits in track 44 is set in association with the outlet 79 of the lubrication means 75 to provide lubrication along the track 44 for the sliding of the axle 20 in the track 44. The wiper 77 is secured to the axle 20 by two bolts, generally designated 85.

An upper mounting bracket 76 is attached to the inward side 78 of the frame 12 at two locations by the identical bolts 50 and nuts 52 that attach the yoke 46 to the frame 12. Holes 80 and 82 in frame 12 provide the proper location for mounting the yoke 46 and upper bracket 76 to the frame 12.

The upper bracket 76 includes a mounting flange 84 perpendicularly disposed to the plane formed by the frame 12 and having an aperture 86. Similarly, lower mounting bracket 62 has a mounting flange 88 perpendicularly disposed to both of the two flanges 90 and 92 forming the L-shaped lower bracket 62. Mounting flange 88 also has an aperture 94. A spring assisted shock absorber 96, including a spring 98, such as that manufactured by the Monroe Auto Equipment Company and designated by the registered trademark Load-Leveler, is mounted to span from mounting flange 84 to mounting flange 88 at apertures 86 and 94 along with spacers 100 and 102, by suitable nut and bolt fasteners 104 and 106.

With the above independent suspension 10, as the trailer wheel moves in response to road conditions, the axle assembly 14 will move vertically up and down in the guide means formed by slot 44, yoke 46, and nut 70. As the axle assembly 14 moves, the lower mounting bracket 62 will also move in the guide means formed by flange 72. The shock absorber 96 will dampen and oppose any vertical movement of the axle assembly 14. Forces are transmitted in the suspension 10 dynamically through the lower bracket 62 to or from the axle assembly 14 and to or from the shock absorber 96. The respective guide means, i.e. the slot 44, yoke 46, and nut 70 of the axle assembly 14 or the flange 72, faces 64 and 66 of boss portion 60, aperture 68, and nut 70 with respect to the lower bracket 62, further limit the movement of the axle assembly 14 and the lower bracket 62 to solely vertical movement in the preferred embodiment.

Referring to FIG. 4, an alternative, preferred embodiment of an independent suspension 100 of the present invention is illustrated mounted to the frame 12 of a light trailer. Each wheel of the trailer 12 is attached to an axle assembly 114 comprised of a spindle 116 and an axle 120. The spindle 116 is identical to the spindle 16 described above, but in the present embodiment the spacer 18 and axle plate 22 are eliminated with axle 120 having an integral annular mounting flange 122. The mounting flange 122 has bores 124 corresponding to the bores 126 through the spindle 116. Four bolts 128 are inserted through the four bores 126 and 124 and nuts 130 are fastened thereto to interconnect the axle assembly 114.

The axle 120 has an extended portion 132, having three substantial changes in diameter 134, 136 and 138. The middle portion 136 of the three portions has faced grooves or surfaces 140 and 142 on opposite sides thereof similar to the faced surfaces 40 and 42 on axle 20, except that faced grooves 140 and 142 only extend a short distance to form two grooves in the middle portion 136 rather than extending to the end of the portion as in axle 20 of FIG. 1. The purpose of the grooves will be described later, as will the purpose of circumferentially extending annular grooves 144 and 146 in middle portion 136. The end portion or boss 38 of the axle 120 is threaded and nut 148 is threadably fastened thereto. A zerk fitting 150 is affixed to the end of the end portion 138 and suitable lubrication means 152 is associated therewith opening into association with the faced grooves 140 and 142.

The axle 120 is slideably fit into the slot or track 154 of track member or yoke 156 at the grooves 140 and 142. The axle assembly 114 further comprises roller thrust bearings 158 and 160 concentrically mounted on the axle 120 so that the rollers 162 and 164 of the bearings 158 and 160 rotatably contact the opposite surfaces 166 and 168 of the yoke 156. Wipers 170 and 172 secure the bearings 158 and 160, respectively, to the axle 120 at circumferential grooves 144 and 146 in middle portion 136. The yoke 156 is directly attached to the outward surface 174 of the frame 12 at two locations by bolts 176 and nuts 178.

Middle portion 136 of the axle 120 has a secured section 180 at the end of said middle portion 136 away from the wheel having faced surfaces on opposite sides thereof, generally designated 182. A lower mounting bracket 186 is mounted to the axle 120 at aperture 188 having a configuration substantially matching the transverse configuration of the reduced section 180 to prevent any circumferential or radial movement of the bracket 186 with respect to the axle 120. The nut 148 secures together in assembly the axle 120 with wiper 170 (against shoulder 190), bearing 158, yoke 156, plate 191 (which retains the balls 162 and 164 in bearings 158 and 160 as the balls pass over the track portion 154 of the yoke 156), bearing 160, wiper 172, lower bracket 186 and an external washer 192, to prevent any axial movement of the above parts with respect to the axle 120 in the axial direction of the axle 120.

The track member 156 has guide means in the form of a perpendicularly disposed flange 194 to guide the path of movement of the lower bracket 186 as the axle 120 moves up and down the track 154 of the track member 156. The lower bracket 186 has a similarly perpendicularly disposed flange 196 located adjacent flange 194 of the track member 156 when nut 148 secures the axle 120 and the other parts of the assembly together.

The lower bracket 186 also has another flange 198 at the lower portion thereof having an aperture 199 to which a spring-assisted shock absorber 200, similar to shock absorber 90 described above, is attached by means of bolt 202, nut 204, and spacer 206. A corresponding upper mounting bracket 208 is attached to the frame 12 in a conventional manner. The bracket 208 also has an aperture 210 to which the opposite end of the spring-assisted shock absorber 200 is mounted by bolt 212, nut 214, and spacer 216.

As the trailer wheel moves in response to road conditions, the axle assembly 114 will move the axle 120 vertically up and down in the guide means formed by the track 154, adjacent flanges 194 and 196, nut 146, and shoulder 190. As the axle 120 moves, the lower bracket 186 will move against the spring assisted shock absorber 200 and the movement will be opposed by spring 218 and dampened by the damping assembly 220.

Thus, there is disclosed in the above description and in the drawings, embodiments of the invention which fully and effectively accomplish the objects thereof. However, it will be apparent that variations in the details of the apparatus and method may be indulged in without departing from the sphere of the invention herein described, or the scope of the appended claims.

What is claimed is:

1. An independent wheel suspension for a light trailer having a frame comprising:
   an axle assembly having means for rotatably attaching a wheel thereto;
   a downwardly projecting track member affixed to said frame having a vertically disposed aperture guide formed within a flat plate structure, said axle assembly passing through said aperture guide and being vertically movable within said aperture guide;
   an upper mounting bracket attached to said frame;
   a lower mounting bracket attached to said axle assembly and movable therewith, said lower mounting bracket having a first surface extending vertically downward from said axle assembly and a second surface horizontally disposed forming a mounting flange located below said axle assembly, said second surface further being located below said track member; and
   a single spring assisted shock absorber mounted between said upper mounting bracket and said mounting flange of said lower mounting bracket.

* * * * *